United States Patent [19]
Brasie

[11] 3,738,615
[45] June 12, 1973

[54] INTERFACIAL SURFACE GENERATOR
[75] Inventor: William C. Brasie, Midland, Mich.
[73] Assignee: The Dow Chemical Company, Midland, Mich.
[22] Filed: Nov. 8, 1971
[21] Appl. No.: 196,352

[52] U.S. Cl. .................................................. 259/4
[51] Int. Cl. ............................................. B01f 15/02
[58] Field of Search ................ 259/4, 18, 36, 60, 259/2, DIG. 30

[56]  References Cited
UNITED STATES PATENTS

| 3,286,992 | 11/1966 | Armeniades | 259/4 |
| 3,460,809 | 8/1969 | Hauss | 259/4 |
| 3,583,678 | 6/1971 | Harder | 259/4 |
| 3,643,927 | 2/1972 | Crouch | 259/4 |
| 3,652,061 | 3/1972 | Chisholm | 259/4 |

Primary Examiner—Robert W. Jenkins
Attorney—William M. Yates and Robert B. Ingraham

[57]  ABSTRACT

Mixing or flow diverting elements are maintained within a plastic lined pipe by introducing a fluid under pressure between the casing of the pipe and the plastic lining.

8 Claims, 5 Drawing Figures

PATENTED JUN 12 1973  3,738,615

INTERFACIAL SURFACE GENERATOR

Various mixing elements are known which may be introduced into a pipe and cause diversion of the flow to provide either mixing by the formation of layers or inversion of the stream where in effect the inner portion of the stream becomes the outer portion and the outer portion becomes the inner portion. Such mixers or flow diverters find application in chemical processes or in the physical blending of liquids, solids or gases. Generally, such flow diverting elements are readily installed in piping employing a variety of means including welding, the use of set screws or retaining flanges. There are many applications which require chemically resistant piping. One particularly desirable form of chemically resistant piping is so-called plastic lined pipe wherein a metallic pipe or conduit is provided with a liner of a synthetic resinous material. One particularly advantageous variety of synthetic resinous materials is a synthetic resinous thermoplastic liner which may be applied by extrusion or molding. In service of such pipes, integrity of the liner is generally critical. For example, in a plastic lined pipe carrying a corrosive material such as hydrochloric acid wherein an outer casing is of mild steel any break in the lining generally leads to rapid failure due to corrosion of the casing. Such thermoplastic materials are often subject to cold flow and, therefore, point loading of the liner is undesirable.

It would be beneficial if there were available an improved flow diverting unit utilizing a plastic lined pipe.

It would also be beneficial if there were available an improved method for the preparation of such a flow diverter.

It would also be desirable if there were available a method for securing flow diverters within a plastic lined pipe which would permit the installation of flow diverters made of a wide variety of materials.

It would be desirable if such method were easily and simply performed in the field.

These benefits and other advantages in accordance with the present invention are achieved in a flow diverter unit, the unit comprising a conduit, the conduit having a rigid outer casing and inner and outer surfaces, a synthetic resinous thermoplastic liner disposed within the conduit and coextensive with the inner surface of the conduit the liner having inner and outer surfaces, a passage within the rigid outer casing extending from the outer surface of the casing to the inner surface of the casing, at least one flow diverter disposed within the conduit within the liner thereof a fluid under pressure disposed between the outer casing and the liner, that fluid being present in sufficient quantity to at least frictionally engage the flow diverter within the conduit.

Also contemplated within the scope of the present invention is a method for the preparation of a flow diverting unit, the steps of the method comprising providing a conduit, the conduit comprising an outer rigid casing and an inner synthetic resinous thermoplastic lining generally coextensive with an inner surface of the conduit, disposing within the conduit at least one flow diverting element applying fluid pressure between the rigid outer casing and the thermoplastic liner sufficient to deform the liner to frictionally engage the flow diverting element therein.

Further features and advantages of the present invention will become more apparent from the following specification taken in connection with the drawing wherein.

Figure 1:
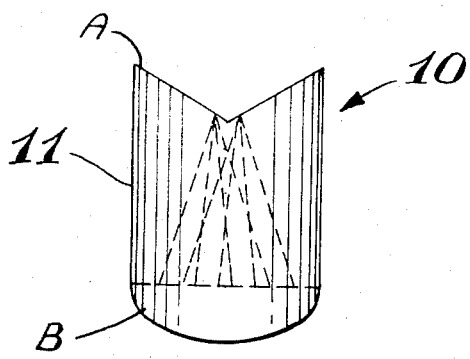

In FIG. 1 there is depicted a flow diverting or mixing element shown in U.S. Pat. No. 3,583,678. The element is generally designated by the reference numeral 10. The element 10 has a first end A and a second end B.

Figure 2:
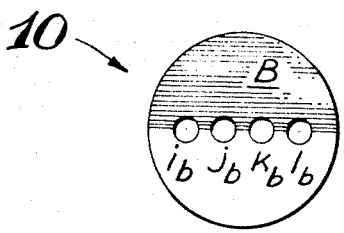

FIG. 2 depicts an end view of the element 10 showing the arrangement of four passageways having openings $i_b$, $j_b$, $k_b$ and $m_b$.

Figure 3:
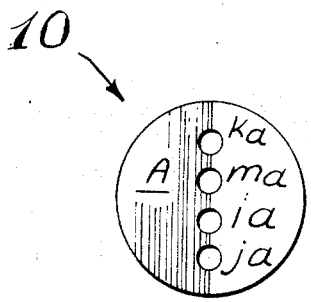
FIGS. 1 through 4 depict four views of one variety of flow diverting element suitable for the present invention.

FIG. 3 shows an end view of the element 10 showing the end A and the arrangement of passageway openings at end A designated by $i_a$, $j_a$, $k_a$ and $m_a$.

Figure 4:
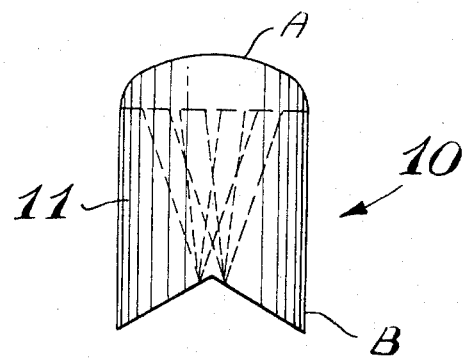

FIG. 4 shows a side view of the element 10 which has been rotated about the axis 90° from the position shown in FIG. 1. The element 10 is of generally cylindrical configuration and has a generally cylindrical outer surface 11.

Figure 5:
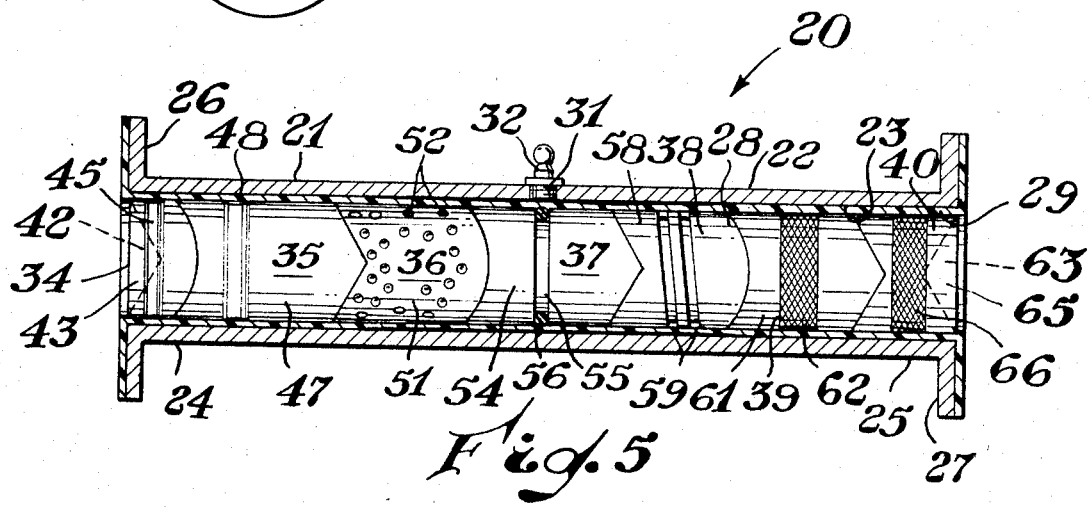
FIG. 5 depicts a sectional view of a conduit in accordance with the present invention.

In FIG. 5 there is depicted a view of the apparatus in accordance with the invention generally designated by the reference numeral 20, the apparatus 20 comprising in cooperative combination a rigid external conduit 21 of material such as mild steel. The conduit 21 has an outer generally cylindrical surface 22 and an inner generally cylindrical surface or face 23. The conduit 21 has a first end 24 and a second end 25. The end 24 has disposed thereon an outwardly radially extending flange 26. A similar flange 27 is disposed on the end 25. Flanges 26 and 27 are particularly suitable for facilitating connection to other conduits. The inner surface 23 defines a generally cylindrical longitudinally extending passageway 28. The passageway 28 provides communication between space external to the first end 24 and space external to the second end 25. The synthetic resinous thermoplastic liner 29 is disposed within the passageway 28 and conforms to the inner surface 23 of conduit 21 and to the adjacent radially outwardly extending faces of the flanges 26 and 27. A passageway 31 is defined in the all of the conduit 21. A valving means 32 is in operative combination with the passageway 31. Beneficially, the valving means 32 may be of any convenient variety as depicted in FIG. 5 and is shown as a conventional surface check grease fitting. A plurality of flow diverting elements 34, 35, 36, 37, 38, 39 and 40 are disposed within the passageway 28 in end-to-end communicating relationship.

For purposes of illustration, the elements 35 through 39 are substantially identical in internal passageway configuration to elements 10 of FIGS. 1 through 4. The elements 34 and 40 are essentially half elements prepared by cutting the flow diverters as depicted in FIGS. 1 and 4 along a diameter about midway between the ends and subsequently forming a conical recess in the ends thereof to reduce "dead" areas within the conduit. Element 34, disposed adjacent the first end 24, has defined therein a generally conical recess 42 and has a generally cylindrical external surface 43. A generally annular recess 45 extending about a diameter of the element 34 is formed in the outer surface 43. The annular recess 45 has a generally smoothly curved cross section adapted to receive deformed liner such as the liner 29. The element 35 has a generally similar external configuration to the element 34 and has a generally cylindrical outer surface 47 having a broad shallow smoothly curved annular groove 48 formed therein. Element 36 has a generally cylindrical external surface 51 having defined therein a plurality of generally conical spaced apart depressions 52. The depressions 52 beneficially have the configuration of depressions prepared by a twist drill having an angle of the cutting edge of about 75°. The element 37 has a generally cylindrical outer surface 54. An annular groove 55 having a generally square or rectangular cross section is diametrically disposed about the element. The annular groove 55 is outwardly facing and contains therein an O-ring 56 of suitable and sufficient size to frictionally engage the liner 29. The element 38 adjacent the element 37 has a generally cylindrical outer surface 58 having defined therein a continuous helically disposed outwardly facing recess 59 which is readily formed with a threading tool in a lathe. The element 39 has a generally cylindrical outer surface 61 having formed thereon a generally peripherally disposed knurled pattern 62. The element 40 defines a generally conical cavity 63 having a generally similar configuration to the cavity 42 of the element 34. The element 40 has a generally cylindrical outer surface 65 which defines thereon a knurled pattern 66.

Flow diverting conduits in accordance with the present invention are readily prepared from a wide variety of conventional materials. For example, many of the commercially available plastic lined conduits have a plurality of small passageways corresponding to the passageways 31 which serve as vents for gases which permeate through the thermoplastic lining material. Generally these may be readily adapted to receive a conventional grease fitting or other conduit suitable for hydraulic fluid. Those passageways which are not required for hydraulic fluid may be plugged oftentimes conveniently with a conventional grease fitting. The presence of flow diverting elements such as the elements 34 through 40 within the thermoplastic lined conduit 21 will provide mechanical support for the liner under either pressure or vacuum conditions. The danger of liner collapse is eliminated and the vents are no longer needed. The desired flow diverting elements are then positioned within the conduit either manually, if sufficient clearance is provided, or they may be forced into the conduit if the thermoplastic liner and element provide an interference fit. Generally it is desirable for maximum convenience in preparing such conduits that the flow diverting elements be a sliding fit. Conveniently, if desired, the end elements, such as the elements 34 and 40, can be provided with a positioning means such as the O-ring 56 of the element 57, or alternately the elements can be temporarily maintained in place by means of blind flanges at the ends. The mixing or flow diverting unit is then connected to a feed and a discharge line by any connecting means desired such as the flanges 26 and 27 of the conduit 21 of FIG. 5. A suitable hydraulic fluid compatible with both the lining material and the rigid housing of the conduit is then passed through the passageway 31 adjacent the inner face 23 of the conduit 21. A particularly convenient hydraulic fluid is petroleum derived lubricating grease. In instances where the liner is not compatible with lubricating grease, any of a wide variety of sealants, liquids or gases may be employed. Generally it is desirable to use a high viscosity grease-like fluid in that high pressures and adequate volume of material conveniently can be delivered with a hand-operated grease gun. Alternately, in cases where reactive chemicals are being treated by the flow diverter, a compressed gas such as nitrogen or air is employed instead of a grease-like material. The compressed gas is particularly convenient if the reactive materials tend to harden such as the urethane polymer forming chemicals. Cleanout and removal of the mixing elements for cleaning is greatly facilitated when a compressed gas is employed between the casing and the liner.

It must be realized that the process of the invention is applicable to lined conduits only when they are at a temperature above the glass transition temperature of the plastic lining. Most common thermoplastic resinous liners which are used for the lining of conduits such as polytetrafluoroethylene, polychlorotrifluoroethylene, polyvinyl fluoride, vinylidene chloride-ethyl acrylate copolymers, polyethylene, polypropylene, rubbers both natural and synthetic generally have glass transition temperatures below normal ambient temperatures. If a liner is employed which has a glass transition temperature above ambient temperatures or will operate at temperatures below the glass transition temperatures, the conduit and liner should be heated to a temperature above the glass transition temperature before the introduction of the fluid under pressure, otherwise brittle failure of the liner may result. Generally it is desirable to size the flow diverting elements in such a manner that the distortion of the liner is relatively small. For example, utilizing a lined conduit for an internal diameter of two inches, a clearance of about 0.2 inch is satisfactory for the flow diverting elements which are to be disposed therein. In many instances where the pressure drop across the mixing elements is relatively small, a smooth cylindrical outer surface on the mixing elements often provides adequate frictional engagement with the liner to prevent any movement of the elements within the conduit. Shallow annular grooves corresponding to the grooves 45 and 48 are satisfactory to retain the elements if the pressure drop is sufficiently great that frictional engagement of the elements by the liner is not sufficient to maintain them in a desired location. Such shallow smoothly rounded grooves are particularly beneficial as the liner material is subject to stress cracking. If stress cracking is not a significant problem, the small depressions such as the depressions 52 on the element 36 are eminently satisfactory, as are the helical grooves 59 which conveniently may be formed with a threading tool in a lathe or the knurling of the elements 39 and 40. In instances where removal of the mixing elements is desired rather than a permanent installation, it is generally desirable that a clearance such as from about 0.04 to about 0.1 inch in a conduit having internal diameter of 2 inches be utilized and advantageously the elements should have a smooth continuous external surface. Shallow threads knurling or recesses such as the recesses 52 are most suitable for permanent installation as the liner under pressure from the hydraulic fluid cold flows into the recesses to provide a mechanical locking. For temporary installation, the use of an O-ring such as shown on the O-ring on element 37 is particularly desirable. The size of the groove in which the O-ring is disposed should be sufficiently small but when the O-ring is compressed the groove is completely filled and the plastic liner not permitted to cold flow into the groove. The apparatus and method of the present invention can be utilized with a wide variety of flow diverting elements such as the interfacing surface generators set forth in U.S. Pat. Nos. 3,583,678, 3,406,947 and 3,239,197, as well as the flowing inverting elements described in U.S. Pat. Nos. 3,128,794, 3,470,912 and 3,470,913.

As is apparent from the foregoing specification, the present invention is susceptible of being embodied with various alterations and modifications which may differ particularly from those that have been described in the preceding specification and description. For this reason, it is to be fully understood that all of the foregoing is intended to be merely illustrative and is not to be construed or interpreted as being restrictive or otherwise limiting of the present invention.

What is claimed is:

1. A flow diverter unit, the unit comprising a conduit, the conduit having a rigid outer casing and inner and outer surfaces, a synthetic resinous thermoplastic liner disposed within the conduit and coextensive with the inner surface of the conduit the liner having inner and outer surfaces, a passage within the rigid outer casing extending from the outer surface of the casing to the inner surface of the casing, at least one flow diverter disposed within the conduit within the liner thereof, a fluid under pressure disposed between the outer casing and the liner, that fluid being present in sufficient quantity to at least frictionally engage the flow diverter within the conduit.

2. The flow diverter unit of claim 1 wherein the flow diverter is an interfacial surface generator.

3. The flow diverter unit of claim 1 wherein a plurality of flow diverters is disposed within the passage.

4. The flow diverter unit of claim 1 wherein the flow diverter has a generally cylindrical outer surface.

5. The flow diverter unit of claim 4 wherein the flow diverter defines an outwardly facing generally annular recess.

6. A method for the preparation of a flow diverting unit, the steps of the method comprising providing a conduit, the conduit comprising an outer rigid casing and an inner synthetic resinous thermoplastic lining generally coextensive with an inner surface of the conduit, disposing within the conduit at least one flow diverting element applying fluid pressure between the rigid outer casing and the thermoplastic liner sufficient to deform the liner to frictionally engage the flow diverting element therein.

7. The method of claim 6 including the step of including a plurality of flow diverters within the conduit.

8. The method of claim 7 wherein the flow diverters are interfacial surface generators.

* * * * *